US007985130B2

(12) United States Patent
Lind et al.

(10) Patent No.: US 7,985,130 B2
(45) Date of Patent: Jul. 26, 2011

(54) METHOD, APPARATUS, AND PROGRAM PRODUCT FOR APPLYING BONUS DESIGNATIONS IN A BINGO GAME

(75) Inventors: Clifton E. Lind, Austin, TX (US); Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1403 days.

(21) Appl. No.: 11/039,038

(22) Filed: Jan. 20, 2005

(65) Prior Publication Data

US 2005/0164772 A1 Jul. 28, 2005

Related U.S. Application Data

(60) Provisional application No. 60/538,328, filed on Jan. 22, 2004.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................................... 463/19

(58) Field of Classification Search ..................... 463/19
See application file for complete search history.

(56) References Cited

U.S. PATENT DOCUMENTS

| | | | | |
|---|---|---|---|---|
| 5,393,057 | A * | 2/1995 | Marnell, II | 463/13 |
| 6,569,017 | B2 * | 5/2003 | Enzminger et al. | 463/19 |
| 2002/0132661 | A1 | 9/2002 | Lind et al. | |
| 2002/0132666 | A1 | 9/2002 | Lind et al. | |
| 2004/0048647 | A1 | 3/2004 | Lind et al. | |
| 2004/0152499 | A1 | 8/2004 | Lind et al. | |
| 2005/0037832 | A1 * | 2/2005 | Cannon | 463/18 |
| 2005/0059468 | A1 * | 3/2005 | Cannon | 463/19 |
| 2005/0124403 | A1 * | 6/2005 | Lavoie et al. | 463/19 |

OTHER PUBLICATIONS

International Search Report under PCT Rule 44.1 for PCT/US05/02127 (8 Pages).

* cited by examiner

*Primary Examiner* — David L Lewis
*Assistant Examiner* — Reginald A Renwick
(74) *Attorney, Agent, or Firm* — Nathan H. Calvert; Russell D. Culbertson; The Culbertson Group, P.C.

(57) ABSTRACT

Bonus designations are considered along with the regular game designations to distinguish between different pattern result levels in a bingo game. A set of one or more bonus designations is selected. Each bonus designation included in the set of bonus designations may be selected from the same pool of bingo designations from which the bingo card designations and game designations are selected. The set of bonus designations is applied to distinguish between a number of pattern result levels associated with each winning pattern that may be achieved in the bingo game and to identify a particular one of the pattern result levels for the respective player/game play request. A prize for each respective player/game play request is awarded based on the pattern result level identified for the respective player/game play request.

28 Claims, 8 Drawing Sheets

METHOD, APPARATUS, AND PROGRAM PRODUCT FOR APPLYING BONUS DESIGNATIONS IN A BINGO GAME

CROSS-REFERENCE TO RELATED APPLICATION

The Applicants claim the benefit, under 35 U.S.C. § 119(e), of U.S. Provisional Patent Application Ser. No. 60/538,328, filed Jan. 22, 2004 and entitled "Method, Apparatus, and Program Product for Applying Bonus Designations in a Bingo Game." The entire content of this provisional patent application is incorporated herein by this reference.

TECHNICAL FIELD OF THE INVENTION

This invention relates to gaming and gaming systems. More particularly, the invention relates to a bingo gaming system that incorporates bonus designations to increase the number of result levels available in bingo games and facilitates the use of smaller groups of players in conducting bingo games.

BACKGROUND OF THE INVENTION

The game known as "bingo" is played with predefined bingo cards that each include a number of bingo designations such as Arabic numerals randomly arranged in a desired manner, commonly in a grid. The bingo designations on the cards are selected from a pool of bingo designations. In traditional bingo games, the cards are physically printed on paper or other suitable material. These traditional printed cards are purchased by players prior to the start of a game. After a buy in period in which players purchase bingo cards for a game, designations from the pool of bingo designations are selected at random to produce a sequence of game designations for the play of the bingo game. As the game designations are selected and announced in the game, the players match the randomly selected game designations with the designations ("card designations") printed on their respective card or cards. This matching and marking of matched designations on the bingo card is commonly referred to as "daubing" the card. The player first producing a predetermined pattern of matches between the randomly selected game designations and the printed card designations on a single card, and then announcing "bingo" to claim the win, is considered the winner. Consolation prizes may be awarded to players having cards matched to produce consolation prize patterns at the time of the winning pattern. Additional prizes may be awarded during the course of a traditional bingo game to players matching other patterns prior to the time the game ending winning pattern is first produced.

There are numerous variations on the traditional bingo game. One particular variation on the traditional bingo game is played with electronic bingo card representations rather than the traditional printed bingo cards. In these electronic bingo games, each bingo card is represented by a data structure that defines the various card locations and designations associated with the locations. The game is played through player stations connected via a communications network. A central computer system or game server in the network may be responsible for storing the bingo card representations and distributing or communicating bingo card representations to players at the player stations. The player stations display the bingo cards defined by the card representations and also allow the players to daub or mark designation matches as game designations are announced in the game. A primary advantage of this type of electronic bingo game is that the games may be played at a much faster pace than is practical with traditional paper bingo. Another advantage of this electronic version of bingo is that the games can be administered and controlled from a remote location and actually played at a number of different bingo establishments, thus allowing greater participation in the games.

U.S. patent application Ser. No. 10/456,721, published as U.S. Patent Application Publication No. 2004/0152499 A1 on Aug. 5, 2004, is directed to a networked electronic bingo gaming system that may facilitate rapid play of bingo games. This bingo gaming system rapidly groups players into relatively small bingo game groups and then conducts an individual bingo game for each group. The system has the capability of choosing groups of any size, from two players to many players. However, it is preferable to include as few players as possible in a group for conducting a bingo game in this system in order to keep the time required for collecting the group of players to a minimum. Including a very small number of players in a bingo game group, however, limits the prize structure available for the various patterns that may be obtained in the bingo game. For example, assume each bingo game group is limited to two players. In this case, exactly one half of the players participating in each bingo game in the system will achieve a winning pattern. This is true because a bingo game ends with a player achieving a game ending winning pattern. Because at least one half of the players participating in each bingo game in the system obtain winning results, the prizes available for winning results must be limited. Prizes associated with non-game ending patterns must also be limited. Thus, limiting the number of players in each bingo game group to a very small number, such as two or three, has the effect of limiting the prize structure available for the game.

SUMMARY OF THE INVENTION

The present invention overcomes the above-identified problems associated with limiting the number of players in a bingo game group by using bonus designations that are considered along with the regular game designations in distinguishing between different pattern result levels. Considering or applying bonus designations together with the regular game designations may produce a greatly expanded number of prize levels or possible results for the game. This expanded number of prize levels or results in the bingo game allows game designers to produce more varied and interesting prize schedules even where each bingo game is played with a very small group of players.

A method according to the invention includes selecting or producing a set of bonus designations that may contain one or more designations. Each bonus designation included in a set of bonus designations is preferably selected from the same universe or pool of bingo designations from which the card designations and game designations are selected. Regardless of how a set of bonus designations is selected or produced, the invention includes applying the set of bonus designations to distinguish between a number of pattern result levels associated with each winning pattern that may be achieved in the bingo game and to identify a particular one of the pattern result levels for the respective player or game play. The bonus designations may be applied in any manner suitable to differentiate between pattern result levels. One preferred form of the invention applies the bonus designations against the game designations in a winning pattern to distinguish between pattern result levels. Another preferred form of the invention applies the bonus designations against all of the card designations to distinguish between pattern result levels.

The present invention is preferably implemented in a networked bingo gaming system including a number of different processing devices for processing or executing computer program code. The invention thus encompasses not only the method of applying bonus designations but also a bingo gaming system implementing the method and a program product executed by the system. In particular, the invention encompasses a program product that includes bonus designation selection program code, bingo game program code, and pattern result level identifying program code. The bonus designation selection program code performs or facilitates the selection of bonus designations for a set of bonus designations used in the invention, and the bingo game program code conducts a bingo game by matching game designations against a number of card representations placed in play for the bingo game. The bingo game program code also identifies winning patterns and non-winning patterns for the various bingo cards in the game. The pattern result level identifying program code applies the set of bonus designations for a given player or players to identify a pattern result level associated with a pattern for the respective player in the bingo game.

As used in this disclosure and the accompanying claims, the term "bingo card" or simply "card" will be used to refer to either a physical bingo card or a bingo card represented by a set of data. It will be noted that the invention is not limited to use in bingo gaming systems employing any given type of bingo card. The invention may be applied to games employing physical bingo cards and to electronic gaming systems employing card representations made up of data which defines card locations and the card designations included at those various locations.

A gaming system implementing the present invention preferably includes a bingo game server or server system and a number of player stations (which may also be referred to as "electronic player stations") in communication with the bingo game server. The player stations each enable the respective player to enter a bingo game in accordance with the invention and may also participate in or help facilitate the selection of bonus designations. Each player station also presents the results of bingo game play to the respective player. The bingo game server or server system preferably collects game play requests from the various player stations, groups the requests for conducting bingo games, actually conducts the bingo games, and also preferably applies the bonus designations to identify the pattern result level of each pattern achieved in the bingo game.

These and other advantages and features of the invention will be apparent from the following description of the preferred embodiments, considered along with the accompanying drawings.

DESCRIPTION OF PREFERRED EMBODIMENTS

The claims at the end of this application set out novel features which the Applicants believe are characteristic of the invention. The various advantages and features of the invention together with preferred modes of use of the invention will best be understood by reference to the following description of illustrative embodiments read in conjunction with the drawings introduced above.

The present invention may be used to expand the available prize levels in many different types of bingo gaming systems. The following description of the present invention will be made in reference to a particular bingo gaming system disclosed fully in U.S. Patent Application Publication No. 2004/0152499 A1 entitled "Method, System, and Program Product for Conducting Multiple Concurrent Bingo-Type Games." However, it should be noted that the invention is not limited to any particular bingo gaming system. Rather, the invention may be used in connection with any bingo gaming system.

Figure 1:
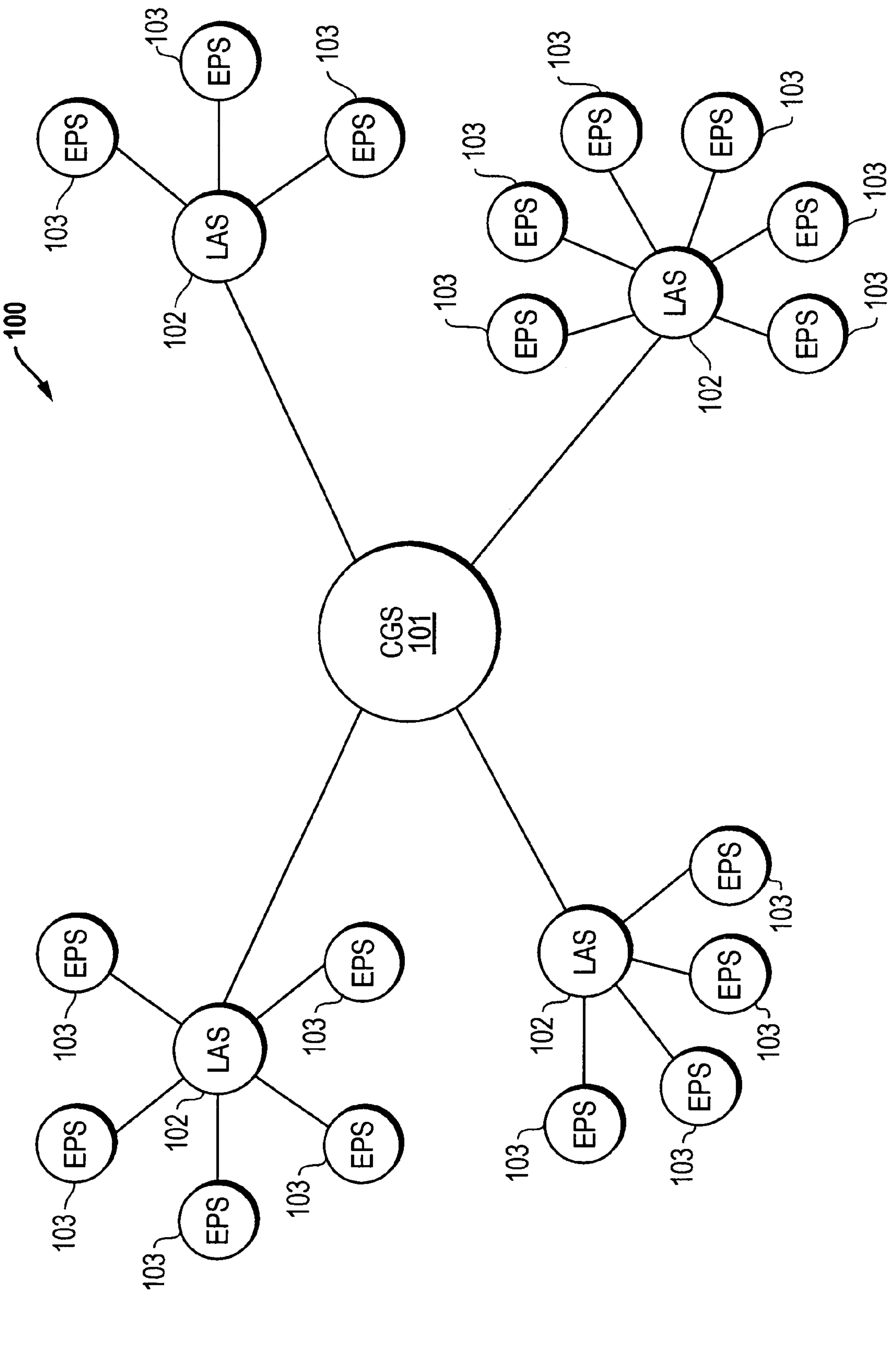
FIG. 1 is a high level diagrammatic representation of a bingo gaming system in which the present invention may be implemented.

FIG. 1 shows a gaming system 100 including a central game server (CGS) 101 that cooperates with a number of other components to enable bingo players, preferably at many different remote gaming sites, to participate in bingo games. Each gaming site includes a local area server (LAS) 102 and a number of electronic player stations (EPSs) 103. As will be discussed in detail below, in the normal operation of gaming system 100, a player at any EPS 103 in the system may participate in a given bingo game with players at any other EPSs 103 in the system. Thus, players at different gaming facilities may be grouped together for a given bingo game administered through system 100. Grouping together players from different gaming facilities for the play of a bingo game allows different bingo games to be played rapidly and minimizes the time that players must wait to receive the result of their participation in the bingo game.

The system includes an arrangement for grouping players and/or game play requests for the play of a single bingo game to facilitate rapid play. This grouping includes limiting the number of players and/or game play requests included in a bingo game to reduce the time required to play the game. System 100 reduces the time between a game play request at one of the EPSs 103 and the return of results to the respective EPS sufficiently to allow a great deal of flexibility in how results in the bingo game are displayed to the player. In particular, the bingo game results may be displayed in some manner unrelated to bingo. For example, the bingo game results may be mapped to a display traditionally associated with a reel-type game (slot machine), to a display relating to a card game, or to a display showing a race such as a horse or dog race, for example. Preferred techniques for mapping bingo game results to displays associated with games or contests unrelated to bingo are described in U.S. patent application Ser. No. 10/060,643, published as U.S. Patent Application Publication No. 2002/0132661 on Sep. 19, 2002, and entitled "Method, Apparatus, and Program Product for Presenting Results in a Bingo-Type Game."

System 100 rapidly groups players and/or game play requests and starts one game after another so that multiple games may be in play at any given time. That is, once a first group of players or game play requests has been assigned to a bingo game offered through system 100, the system proceeds to simultaneously administer a bingo game for the first group of players or game play requests and also begins grouping players or game play requests for a next bingo game. System 100 does not necessarily wait for one bingo game to be completed before starting to collect players or game play requests for, and actually beginning play in, the next bingo game. The number of players or game play requests grouped for the play of bingo games according to the present invention may be limited to reduce the time required for grouping. For example, each bingo game offered through gaming system 100 shown in FIG. 1 may be limited to between 2 to 20 players or game play requests. The present invention allows these bingo game groups to be limited to very few players while still allowing a varied and interesting pay table for the bingo game as will be discussed in detail below.

Regardless of the rapid play facilitated by system 100 and regardless of the manner in which the bingo game results are displayed, the underlying game remains a standard bingo game played in the traditional sequence of play for bingo games. That is, each player obtains or is assigned a bingo card or bingo card representation, all bingo cards in play in the game are daubed or checked for matches with a sequence of game designations or "draw," and the first card in the game to match the sequence of game designations to produce the game ending winning pattern represents the card that may win the bingo game, subject to any required claiming action required under the rules of the game. Additional prizes may be awarded for other patterns that may be produced in the course of the bingo game. The mapping of different prizes to various bingo patterns that may be produced in the course of a bingo game in system 100 may be accomplished as described in U.S. Pat. No. 6,569,017 B2, entitled "Method for Assigning Prizes in Bingo-Type Games" or U.S. patent application Ser. No. 10/238,313, published as U.S. Patent Application Publication No. 2004/0048647 A1 on Mar. 11, 2004, entitled "Prize Assignment Method and Program Product for Bingo-Type Games," modified as described below to account for the various pattern result levels identified by applying bonus designations.

As used in the remainder of this disclosure and the accompanying claims, any sequence of game designations that may be matched against bingo cards or card representations in the course of a bingo game is referred to as a "draw" regardless of how the sequence is actually generated. Under this definition, it will be appreciated that a draw may be produced by a random number generator, a pseudo random number generator, or any other suitable device or system, such as a manual, semi-automatic, or fully automatic physical ball draw device.

Figure 2:
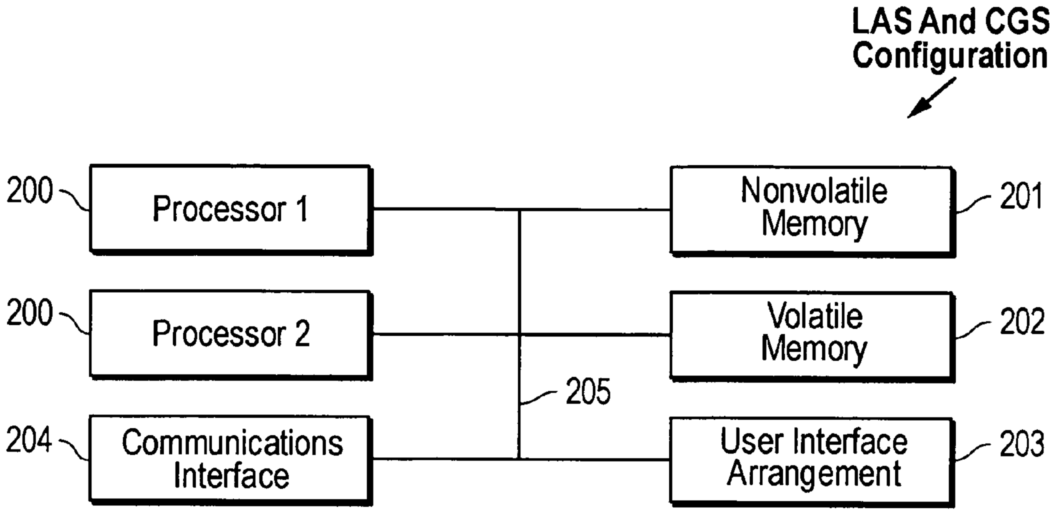
FIG. 2 is a diagrammatic representation of a computer system arrangement that may be used for the central game server and local area servers included in the system shown in FIG. 1.

CGS 101 may comprise a computer system such as the basic system shown in FIG. 2. The basic system may include one or more processors 200, nonvolatile memory 201, volatile memory 202, a user interface arrangement 203, and a communications interface 204, all connected to a system bus 205. It will be appreciated that user interface arrangement 203 may include a number of different devices such as a keyboard, a display, and a pointing device such as a mouse or trackball for example, although not shown in FIG. 2. Alternatively to the integrated user interface arrangement 203 shown in FIG. 2, a user interface for CGS 101 may be provided through a separate computer (not shown) in communication with the CGS. Regardless of the particular configuration for CGS 101, in the normal operation of system 100 shown in FIG. 1, the CGS functions to group players for participation in bingo games offered through the system, produces or obtains a sequence of game designations (that is a draw) for each bingo game, identifies the results in each bingo game, and communicates the results to the EPSs 103 through LASs 102. Specific processes that may be performed by CGS 101 to apply the bonus designations in identifying results in the bingo games will be described below with reference to FIG. 7.

Each LAS 102 included in system 100 as shown in FIG. 1 may comprise a computer system having the same basic structure as shown in FIG. 2. That is, each LAS 102 may include one or more processors 200, nonvolatile memory 201, volatile memory 202, user interface arrangement 203, and communications interface 204, all connected to system bus 205. As with CGS 101, the user interface for the respective LAS 102 may be provided through a separate computer that communicates with the LAS rather than the integrated user interface arrangement 203 shown in FIG. 2. Regardless of the specific configuration of LAS 102, each LAS serves, in normal operation of the system shown in FIG. 1, to transfer or relay information from its respective EPSs 103 to CGS 101, and to transfer or relay information from the CGS to the LAS's respective EPSs. Each LAS according to the present invention may also have the ability to group players and actually conduct bingo games in certain situations. For example, where one LAS 102 serves a large number of EPSs 103, the LAS may group players or game play requests from its respective EPSs during a time of high player activity, obtain or produce a draw, identify results, and return results to the EPSs rather than having the CGS 101 perform these tasks. Also, each LAS 102 shown in FIG. 1 may be configured to perform the tasks normally performed by CGS 101 in the event the communications link between the respective LAS and CGS is degraded below a certain level or is severed altogether. Thus, the processes of applying the bonus designations described below with reference to FIG. 7 may be performed at a LAS 102 within the scope of the present invention.

Figure 3:
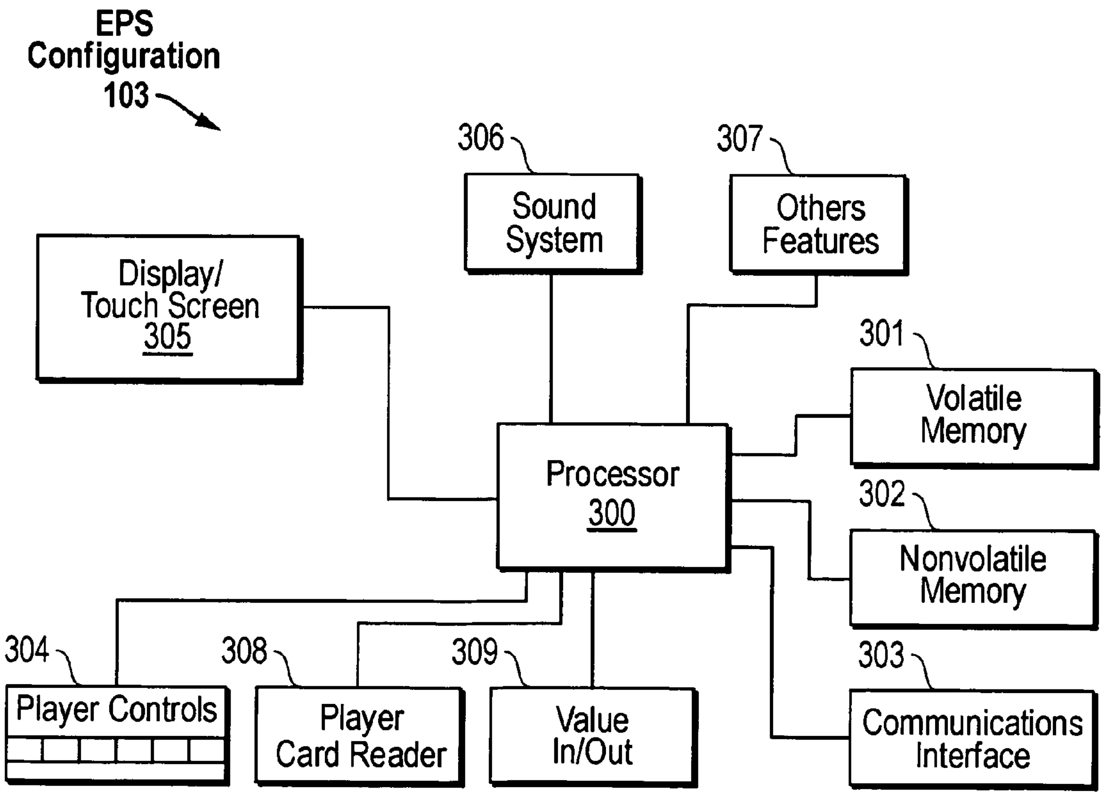
FIG. 3 is a diagrammatic representation of an electronic player station that may be used in the system shown in FIG. 1.

FIG. 3 shows an example of an EPS 103 that may be used as a player interface device in a gaming system that uses bonus designations according to the present invention. The illustrated EPS 103 includes a processor 300, volatile memory 301, nonvolatile memory 302, and a communications interface 303. The volatile and nonvolatile memory stores computer program code that may be executed by processor 300 to cause the processor to perform or direct the various functions provided by EPS 103. Communications interface 303 allows communications between EPS 103 and its respective LAS 102 and/or CGS 101. EPS 103 also includes a special user interface arrangement to facilitate player participation in the bingo games offered through gaming system 100 shown in FIG. 1, and display results in an exciting and attractive format. This interface includes player controls 304, a display or touch screen display 305, a sound system 306, and perhaps other features 307 such as alarms or special displays or alerting devices. Part of this participation in bingo games may involve manually selecting bonus designations in some forms of the invention as will be described further below with reference to FIG. 7. Each EPS 103 also preferably includes a convenient system for allowing the player to input player-specific information and for receiving wagers and dispensing winnings. For example, the EPS 103 shown in FIG. 3 includes a player card reader 308 that is adapted to read player-specific information from a player account card inserted into the reader. A player account card may, for example, include player information or simply a player identifier encoded on a magnetic medium (mag stripe) associated with the player account card, or encoded on bar code, or a memory device associated with the player account card. The illustrated EPS 103 also includes a device 309 for receiving value and issuing value in the course of play. This device may accept currency, vouchers, or tokens, for example, and also output currency, vouchers, or tokens. Of course, a separate device may be used to receive and issue value for games played according to the present invention. Alternatively or in addition to value in/out device 309, EPSs 103 may read player account information from the player account card or player information otherwise input at the EPS, and account for wagers and winnings in the manner set out in U.S. patent application Ser. No. 10/044,478, published as U.S. Patent Application Publication No. 2002/0132666 A1 on Sep. 19, 2002, entitled "Distributed Account Based Gaming System."

It will be appreciated that the particular configuration of devices shown in FIG. 1 is shown only for purposes of example. A bingo gaming system in which the present invention may be used may omit some or all of the separate LASs 102 at the various gaming facilities so that the EPSs 103 communicate directly with CGS 101. Also, various regions or different gaming facilities may be divided up into separate systems each having a respective CGS such as CGS 101. In these situations the system could be configured such that a single EPS 103 may be serviced by any of the CGSs. Furthermore, a gaming system using bonus designations according to the present invention may include multiple CGSs rather that a single CGS 101 as shown in FIG. 1.

In the following description of FIG. 4 and the other process flow charts in this disclosure, it will be appreciated that the references to the physical components are references to the diagrams in FIGS. 1, 2, and 3 that show those components. The components, such as EPSs 103, LASs 102, and CGS 101 discussed with reference to the flow charts are generally not shown in the flow charts themselves but are shown particularly in FIG. 1.

Figure 4:
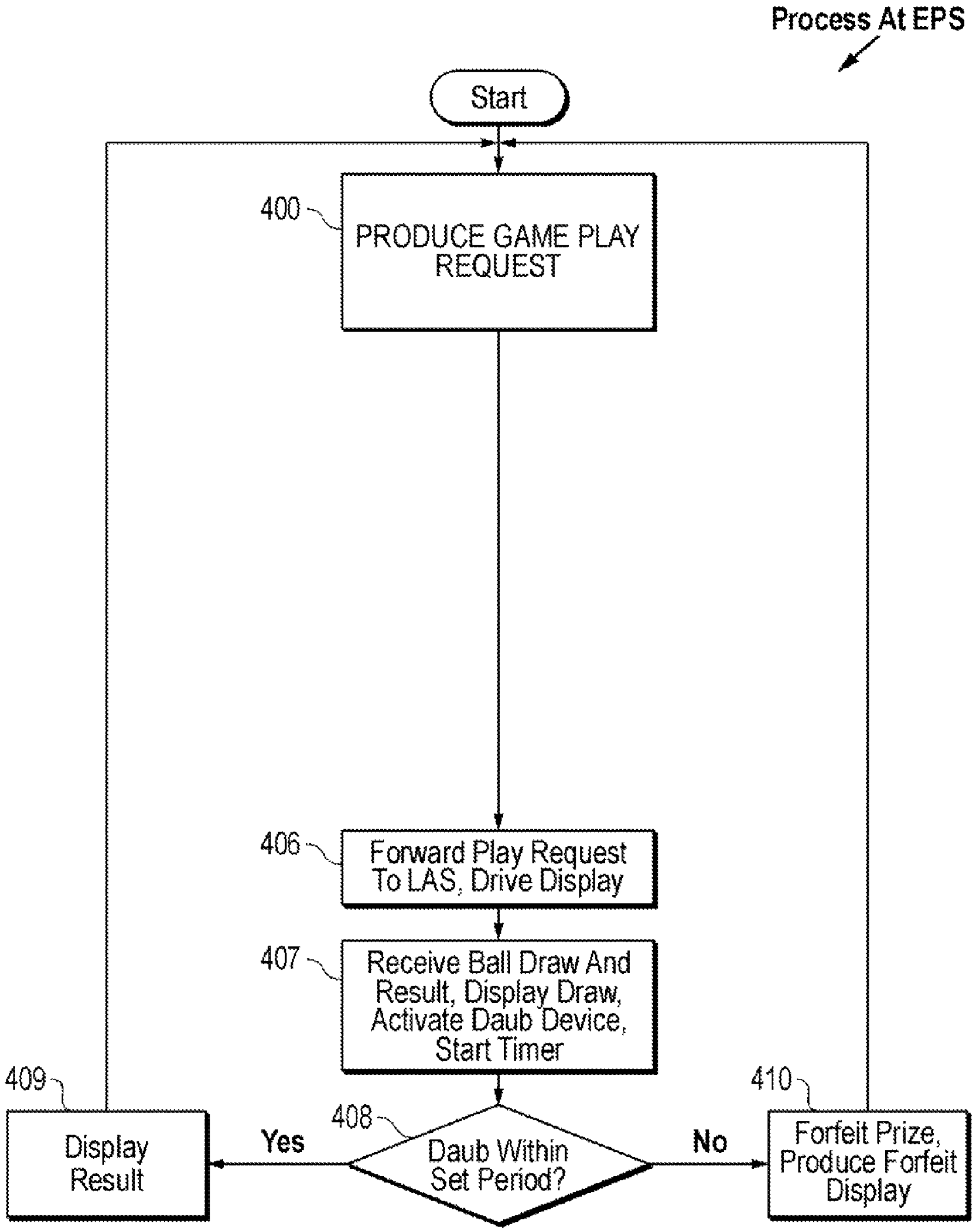
FIG. 4 is a flow chart providing a high level description of a process executed at the electronic player stations according to the present invention.

FIG. 4 shows a process that may be performed at an EPS 103 according to the invention. After EPS 103 is initialized and activated for use by a player, the process at the EPS includes producing a game play request as shown at block 400. This step may include a number of separate steps or substeps, such as assigning a bingo card to be placed in play, designating a wager level, and making a game play input. These details associated with producing a game play request are described in detail in prior U.S. Patent Application Publication No. 2004/0152499 A1. These details will not be repeated here so as not to obscure the present invention in unnecessary detail. However, it should be noted that the game play request produced at process block 400 in FIG. 4 will not only be associated with at least one bingo card but may also be associated with a set of bonus designations selected at or through EPS 103. That is, the step of producing a game play request 400 may include the step of either manually selecting bonus designations at the player station under the control of a first device, which may be included in player controls 304 at EPS 103, that is operated by the player and bonus designation selection program code executed at least partially at EPS 103. The bonus designations may also be automatically selected under the control of a first device, where the first device is a processing device located at the EPS that executes the bonus designation selection program code.

Once the player has, in one fashion or another, made an input at EPS 103 to enter their card or cards in a bingo game administered through the gaming system (100 in FIG. 1), the EPS forwards a game play request to the respective LAS 102 as indicated at process block 406 in FIG. 4, and preferably drives a display showing some type of entertaining graphics pending the return of the result for the player's card(s) and set of bonus designations in the bingo game. For example, EPS 103 may be configured to display results associated with the underlying bingo game in terms of reel stop positions for a reel-type gaming machine (slot machine). For this type of result display, the step of driving the display at process block 406 may include showing a number of reels spinning to imitate the spinning reels one would see immediately after activating a traditional reel-type gaming machine. Alternatively, results from the bingo game may be displayed in some other entertaining fashion such as a horse or dog race for example, and the step of driving the display shown at process block 406 in FIG. 4 may include an initial portion of the race. In yet other forms of the invention, results may be displayed as in a traditional bingo game and the step of driving the display shown at process block 406 in FIG. 4 may include simply displaying the bingo card that has been assigned to the player and placed in play. Even where the results of the bingo game may be shown with entertaining graphics unrelated to the bingo game, a portion of the display at EPS 103 is preferably devoted to a representation of the bingo card in play and draw for the bingo game in which the card is entered along with the set of bonus designations applied according to the invention.

The nature of the communication forwarding the game play request to LAS 102 will depend upon a number of factors. For example, the communication may include an actual card definition that defines the respective player's card which is in play for the game together with the set of bonus designations to be applied. Alternatively, where card definition files are available at the various system components as described in U.S. Patent Application Publication No. 2004/0152499 A1, the communication may include a card identifier for each card placed in play and this identifier may be used to locate the actual card definition. In still other forms of the invention, the player's card or cards placed in play from EPS 103 may be known to the LAS or CGS. In this case, the game play request sent to LAS 102 at block 406 in FIG. 4 may not include even an identifier for the card(s) in play, but merely some signal for the LAS to place the card(s) in play for the requesting player. Depending upon how the set of bonus designations is produced, this information too may be known to the LAS or CGS and thus may not be included in the communication forwarding the game play request.

Regardless of how EPS 103 drives the display at process block 406 in FIG. 4, the EPS receives a draw for the game in which the player has been entered and, for each card placed in play, a result for the game play which has been identified at the LAS 102 or CGS 101 as will be described in detail below. The receipt of the draw and result is shown at process block 407 in FIG. 4. The result received at EPS 103 represents the result of the respective player's card in the bingo game in which the player's card has been entered, after consideration of the set of bonus designations. As in any bingo game, the result is associated with some pattern and/or sequence of spots on the player's bingo card that have been matched by designations in the ball draw. However, according to the present invention, the result is also dependent upon the bonus designations applied for that game play according to the applicable bonus designation application rules. It will also be appreciated that the result communicated to EPS 103 at process block 407 is preferably some result code that represents the actual bingo result. The draw and result (and the set of bonus designations where the EPS 103 is not involved in producing the set) may be sent to EPS 103 separately or in a single communication. In either case, the preferred form of the invention displays the draw on the display associated with the EPS prior to the time the respective game result is displayed.

In some preferred forms of the bingo gaming system, the bingo player must claim their bingo prize associated with a winning result. In systems in which the player must claim their prize, the EPS process may include activating a prize claiming or daub input at EPS 103 in the event a game play returns a winning result. This prize claiming or daub input activation is included at process block 407 in FIG. 4 along with the activation of a timer which sets a time period for the player to actuate the prize claiming or daub input and claim the prize. In a preferred form of the process at EPS 103, the EPS also produces a display indicating to the player that they must take a particular action to claim their prize, and indicating or counting down the time remaining to claim the prize. This timer or countdown display may be in addition to or in lieu of the display initiated at process block 406. A countdown timer display according to the invention may be superimposed on the display initiated at process block 406.

If the player claims their prize by taking the appropriate action within the set period of time as indicated by decision block 408 in FIG. 4, EPS 103 displays the result of the game for the player as indicated at process block 409, and gaming system 100 awards the prize to the player. In the example described above in which the results may be displayed by reel-type or slot machine graphics, the display at EPS 103 may show reels stopped in particular positions that together correspond to the result achieved by the player in the bingo game. In the example where the results are shown by a horse or dog race, EPS 103 may show a particular horse or dog in a win, place, or show position corresponding to the result the player has achieved in the bingo game.

In the event the player at EPS 103 does not take the required action to claim the prize within the set period of time, the prize associated with the player's result in the bingo game may be forfeited as indicated at process block 410. In the case of a forfeited prize, EPS 103 may also produce a suitable display to indicate to the player that the prize associated with the play in the bingo game has been forfeited. Any forfeited prizes may be collected and applied to a progressive game offered through system 100 or may be collected for use as a charitable contribution. The forfeiture process may include subtracting a prize value from the player's account. This prize value may have been previously added to the player's account by system 100 automatically in response to the winning result. Whether a prize has been forfeited as shown at process block 410 or has been claimed and the result displayed as shown at process block 409, the process at EPS 103 may return to game play request production step 400 shown in FIG. 4.

In some instances, the result from the bingo game may not be associated with any prize. In these instances, the process at EPS 103 may not activate a daub or prize claiming input device, and not wait for an input before displaying the result. Rather, the process at EPS 103 may simply include displaying the non-winning result immediately after receiving the result from LAS 102 without further intervention on the part of the player.

In some forms of the invention, the player's failure to enter a prize claiming or daub input may not result in the forfeiture of the prize, but rather cause the underlying bingo game to proceed with the draw (or additional numbers in the already defined draw sequence). In these forms of the invention, a player's failure to claim the game ending prize causes the underlying bingo game to continue with additional bingo numbers until another game ending winner is produced. This new game ending winner may then be given the opportunity to claim the game ending prize. If the player fails to take the result claiming action at this point, the result may be forfeited or the game may proceed again until another new apparent game ending winner is identified.

In yet other forms of the invention, the EPS 103 may force the player to take a result claiming action in order to proceed on to another game. Also, the result claiming action may be defined broadly so as to ensure that a player takes the action to claim their result. For example, where a player account card must be inserted into an EPS 103 in order for a player to participate in a bingo game offered through system 100, the act of removing the player account card may be defined as the result claiming action if the EPS 103 is waiting for such an action from the player.

Figure 5:
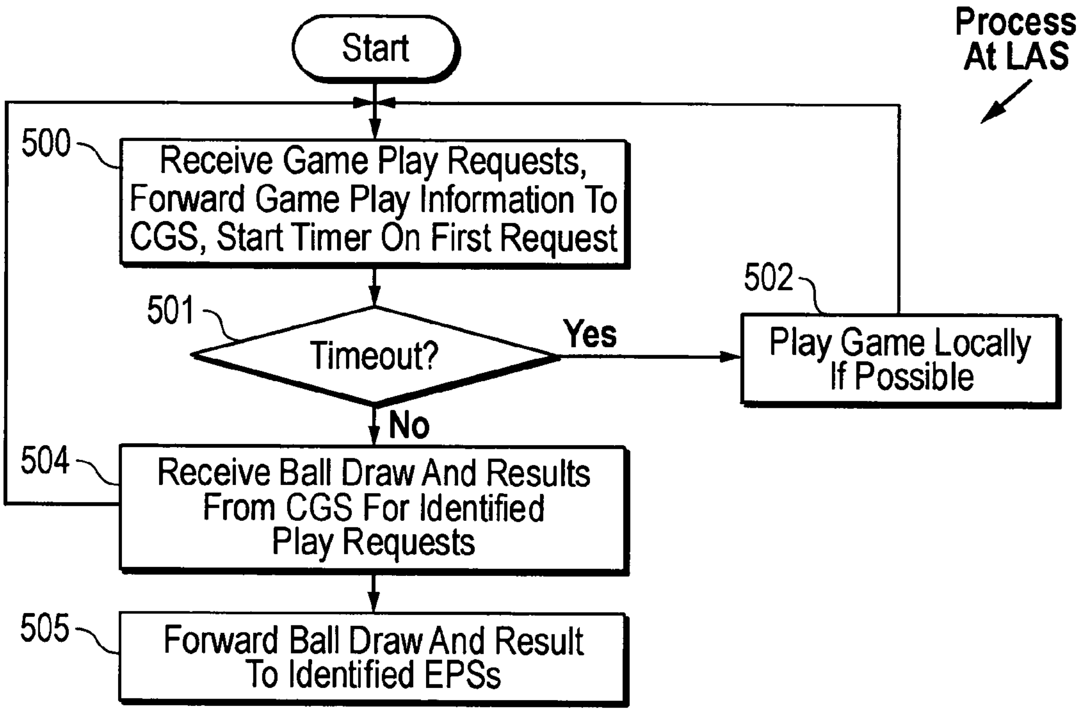
FIG. 5 is a flow chart providing a high level description of a process executed at the local area servers according to the present invention.
Figure 6:
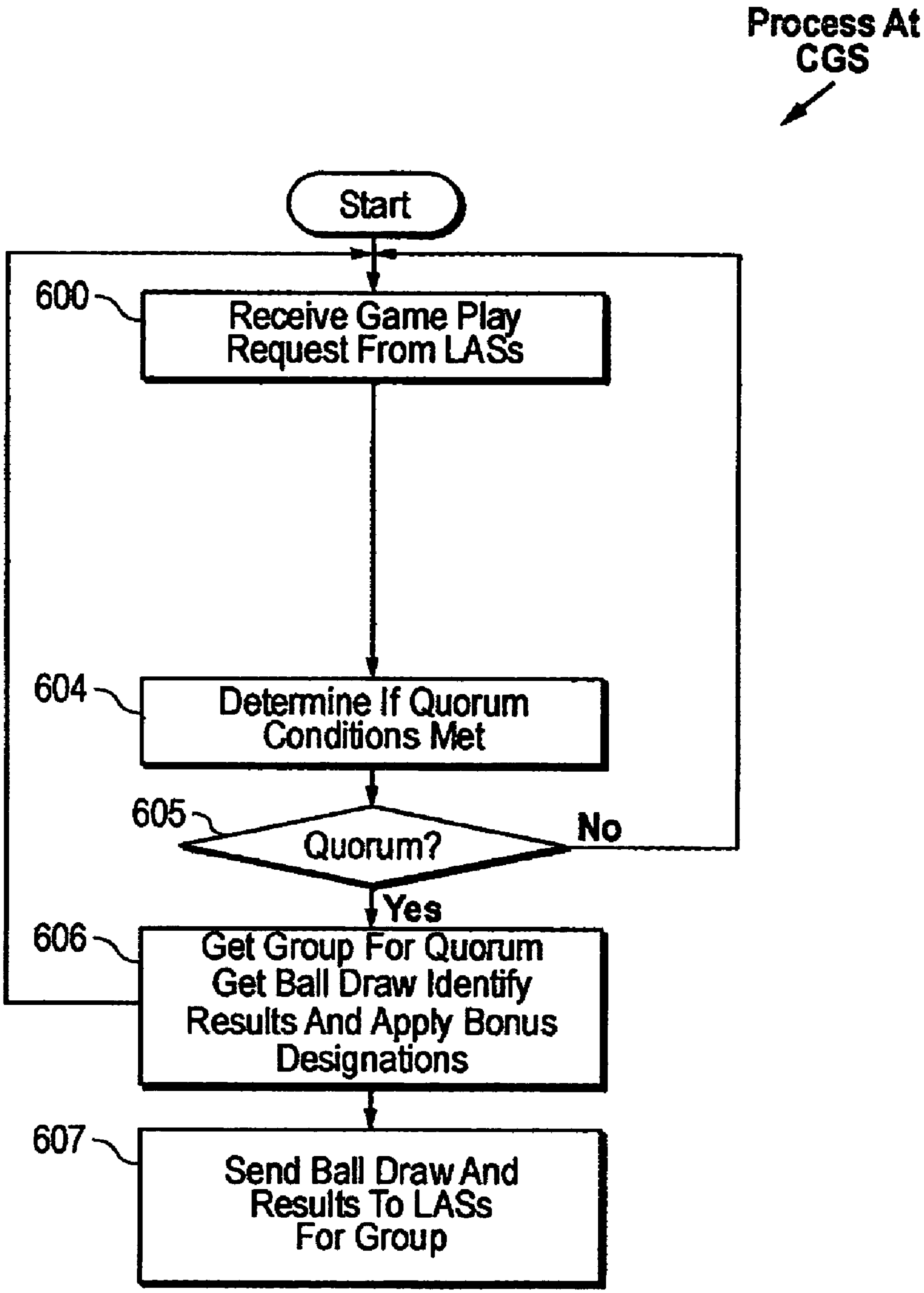
FIG. 6 is a flow chart providing a high level description of a process executed at the central game server according to the present invention.

FIGS. 5 and 6 may be used to describe one preferred arrangement for cooperation between the LASs 102 and the CGS 101 in system 100 shown in FIG. 1, and to describe the processes performed at the LASs 102 and CGS 101 in that arrangement. In this particular arrangement for cooperation between LASs 102 and CGS 101, the CGS always groups players or game play requests for each game available through the system. The group of players or game play requests for a game administered through system 100 may be referred to in this disclosure as a quorum or a bingo game group and will comprise some minimum number of players that may be a fixed number, a range of numbers, or a number determined dynamically depending upon certain system operating parameters and/or the nature of the game play requests. The present invention of applying bonus designations allows the number of players/game play requests for a quorum to be maintained low without significantly limiting the prize structure for the bingo game.

Referring now to FIG. 5, each LAS 102 receives a game play request from one of the EPSs 103 serviced by the respective LAS 102 and immediately forwards the game play request to CGS 101 along with information associated with the game play request such as a card definition or card identifier from which the card definition may be determined, and perhaps the set of bonus designations to be applied for the game play request. This receiving and forwarding step is shown at process block 500. As indicated at block 500, the LAS process may also include starting a timer on the receipt of the first game play request from a local EPS 103 for a given game. If a timer set at process block 500 times out before CGS 101 returns a ball draw and results for the game play requests which have been collected and forwarded to the CGS as indicated at decision block 501, LAS 102 may attempt to play the game locally if possible as indicated at process block 502. A timeout may occur if the communications link has been broken with CGS 101, or if the communications link has been degraded in some fashion. In this case it is necessary for LAS 102 to attempt to play games with only local players. Of course, if quorums cannot be produced locally with sufficient speed, LAS 102 may simply notify the EPSs 103 that new games are not presently available, or if the situation is transient, return even money results to the requesting players as discussed in U.S. Patent Application Publication No. 2004/0152499 A1. Of course, a major advantage of maintaining a low minimum number for a quorum as is facilitated by the present invention, is that a quorum may generally be created quickly even when considering game play requests collected from a relatively few EPSs 103.

In situations where no timer is used at LAS 102 or a timeout has not occurred at decision block 501, the LAS receives a draw for the game play requests it has forwarded to CGS 101 along with the results of the game for those game play requests/players. The actual communications between LAS 102 and CGS 101 may require that the draw is sent in one communication and the results are sent as a separate communication or communications, otherwise both the draw information and results for the game may be sent as a single communication. At process block 504, LAS 102 receives the draw and results for the collected number of game play requests that were forwarded to CGS 101. The process at LAS 102 then proceeds to forward the received draw to the EPSs 103 from which the collected game play requests originated, as shown at process block 505. LAS 102 also forwards the results for the various game play requests, that is, the game results, to the respective EPSs 103. It will be noted that once a ball draw and results have been received for one group of game play requests that have been forwarded to CGS 101, the process returns back to process block 500 and continues to receive and forward game play requests for another bingo game as indicated by the line returning from block 504 to a point in the process immediately below the starting point.

FIG. 6 shows a process at CGS 101 that may be used in connection with the LAS process shown in FIG. 5. The process for CGS 101 includes receiving game play requests from the various LASs 102 as shown at process block 600 in FIG. 6. The bingo game group is collected until CGS 101 determines if predetermined quorum conditions have been met as shown at process block 604. Preferred alternatives for this quorum determining step are described in prior U.S. Patent Application Publication No. 2004/0152499 A1 and will not be repeated here. As shown at process block 605, if it is determined that conditions for a quorum have not been met, the process returns back to process block 600 to receive further game play requests from LASs 102. However, if conditions for a quorum have been met as indicated at decision block 605, CGS 101 obtains or produces a draw for the game and identifies the results associated with the game by comparing the draw with the bingo cards associated with the game play requests which make up the quorum and by applying the applicable bonus designation set or sets. These functions are shown generally at process block 606 in FIG. 6, and further details regarding the application of bonus designations will be described further below with reference to FIGS. 7, 8, and 9. In addition to the other steps set out at process block 606, the process returns back to process block 600 to continue receiving game play requests from the LASs for other bingo game groups. As shown at process block 607 in FIG. 6, CGS 101 also communicates the draw and results for a given game to the LASs 102 implicated for the particular bingo game group for which a game has been played or initiated, and for which results have been obtained.

The discussion above regarding FIG. 6 assumes that it is the CGS 101 that groups players and conducts bingo games in system 100. However, it will be appreciated from U.S. Patent Application Publication No. 2004/0152499 A1 that alternative arrangements may allow the LASs 102 to group players and conduct games in certain circumstances. In these alternative arrangements, the step of applying bonus designations may be performed by the respective LAS 102 grouping the game play requests and conducting the game.

Figure 7:
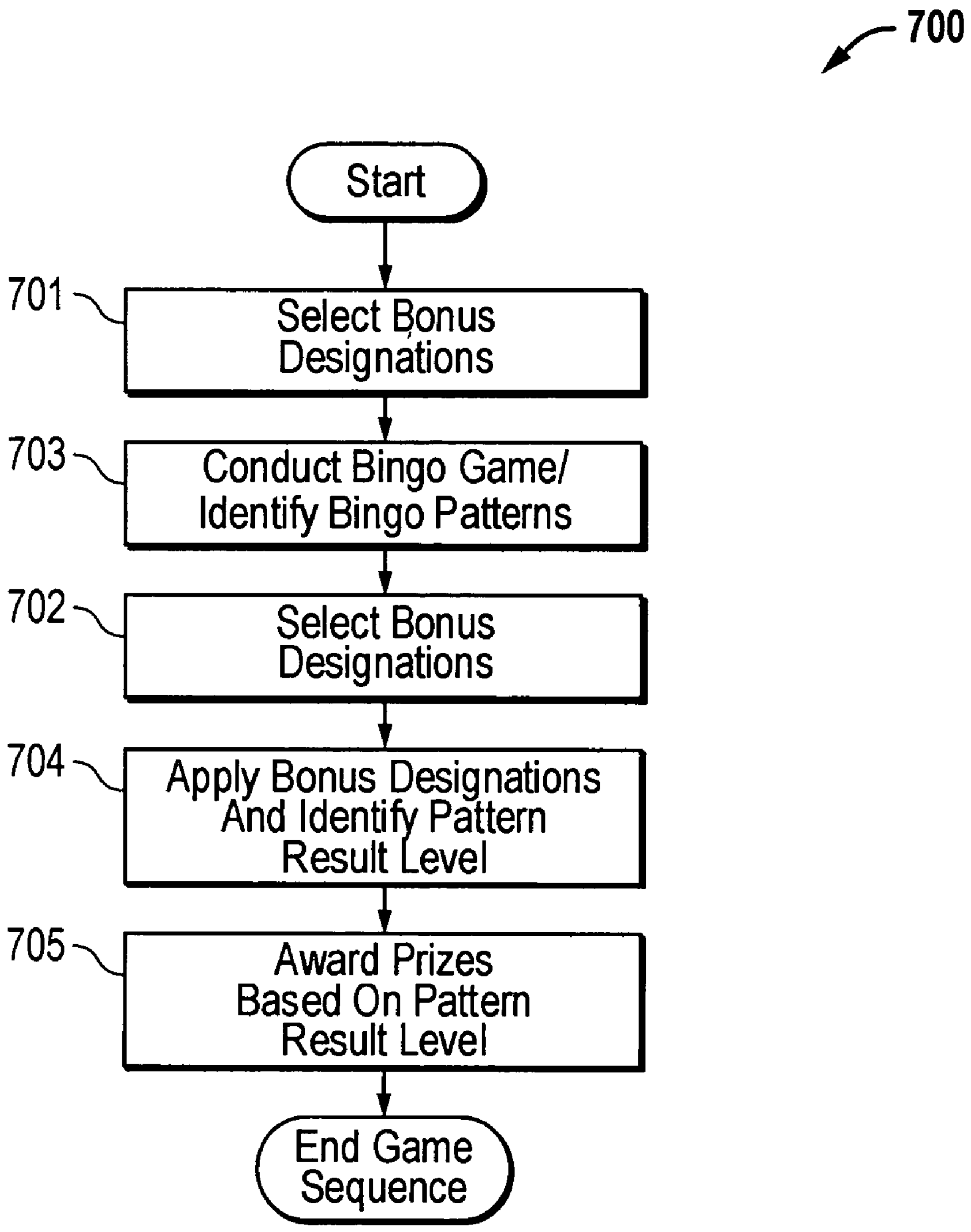
FIG. 7 is a flow chart illustrating a method of using bonus designations according to the present invention.

FIG. 7 shows a process 700 for using bonus designations in a bingo game according to the present invention. As shown at block 701 in FIG. 7, the invention includes the step of selecting bonus designations. FIG. 7 also shows a separate step of selecting bonus designations at block 702. Selecting bonus designations may be performed at either the location shown at block 701 or the location shown at block 702, or at both points within the scope of the present invention as will be discussed further below. In any case, the step of selecting bonus designations preferably includes selecting designations from the pool of bingo designations used to create bingo cards that may be in play in the game and from which the draw or game designations are selected. It should be noted, however, that other forms of the invention may select the set of bonus designations from a subset of this entire pool. Also, as stated previously, the selection of a set of one or more bonus designations may take place under the control of a first device. The selection step may be performed at least in part with the player manually selecting the bonus designations. Alternatively, a suitable processing device may be used to randomly select designations for inclusion in the set of bonus designations. It is also possible within the scope of the invention to combine both manual selection by a player and automatic selection by a suitable processing device. It should also be noted that the selection step shown at blocks 701 and 702 need not be performed each time a bingo card is placed in play in a bingo game. Rather, the set of bonus designations may be selected and then used for different game play requests and different bingo games. A system for implementing the invention may include a storage device that allows a player to store one or more favorite sets of bonus designations which may be recalled by the player and used for a given bingo game at the player's selection. The bonus designation selecting step or steps may also be performed once and the selected bonus designations used for all players in a bingo game or several bingo games, or may be performed separately for each player in a game.

It will be noted that the step of selecting bonus designations at process block 701 in FIG. 7 may be performed by the player even if the player knows the designations included in the bingo card or cards they wish to place in play depending upon the rules by which the bonus designations are used to identify different pattern result levels. However, the player should generally not be allowed to select bonus designations where the rules by which the bonus designations are applied are such that the player's selection of bonus designations affects the chances of obtaining any of the prizes available in the game.

As shown at process block 703 in FIG. 7, a process within the scope of the invention may include the step of conducting a bingo game and identifying the patterns produced with the various bingo cards in play by matching the draw to the bingo cards. This step corresponds to the step shown at process block 606 in FIG. 6 (and process block 502 in FIG. 5 for, implementations in which a bingo game may be played locally at a LAS 102). It will be appreciated that an implementation of the present invention need not identify bingo patterns, but may obtain information on the bingo patterns from a separate process. Whether the step shown at block 703 is included in an implementation of the invention or is performed by some separate agent, the step includes generating or obtaining a draw (sequence of game designations) and matching the draw to the bingo cards in play for the given bingo game group, and identifying the resulting patterns including winning patterns or potentially winning patterns. The phrase "potentially winning pattern" is used here to include the situation described above in which the player must take one or more actions to claim the winning pattern and associated winning result. It should also be noted that the step of conducting the bingo game as shown at block 703 in FIG. 7 encompasses the situation in which the draw is considered, disclosed to the respective players, produced, or obtained in two or more groups as opposed to a single group.

An important variation within the scope of the present invention performs the selection of bonus designations concurrently with the conduct of the bingo game. For example, rather than select the set of bonus designations as one or more separate steps as indicated in FIG. 7, the first five designations from the draw in the bingo game may be defined as bonus designations. These designations may then be applied as bonus designations to distinguish between different pattern result levels as will be discussed further below with reference to FIGS. 8 and 9. Those designations could also be considered as regular game designations in the draw for the purposes of identifying bingo patterns in the game.

The step of applying the set of bonus designations and identifying pattern result levels shown at process block 704 in FIG. 7 may be performed in a number of different ways within the scope of the present invention. In one preferred form of the invention, the set of bonus designations is compared only to the designations included in the various card locations forming a winning pattern on the respective player's bingo card. An alternate preferred form of the invention applies the set of bonus designations to match designations at any card locations included in the respective player's bingo card. These two alternatives will be described further below with reference to FIGS. 8 and 9. In the latter alternative for applying the bonus designation set, the bonus designation set may be applied against the players' respective bingo card or a separate bingo card that may be different for each player in a game or common among all players in a given game. Also, the application of bonus designations according to the invention need not be against a bingo card at all. That is, the set of bonus designations may be applied against a sequence of randomly drawn designations separate from any bingo card representation if the rules for applying the designations do not merely apply them against matched locations in a player's bingo card.

The final step in the process illustrated in FIG. 7 includes awarding prizes based on a pattern result level as shown at process block 705. As will be discussed further below with particular reference to FIG. 9, each bingo pattern in the game according to the present invention may be associated with two or more pattern result levels. Each pattern result level may be associated with a different prize or game result. The step shown at process block 705 in FIG. 7 includes awarding to each participant in a bingo game the prize or result corresponding to the pattern result level that was identified for the respective player by applying bonus designations at process block 704.

Figure 8:
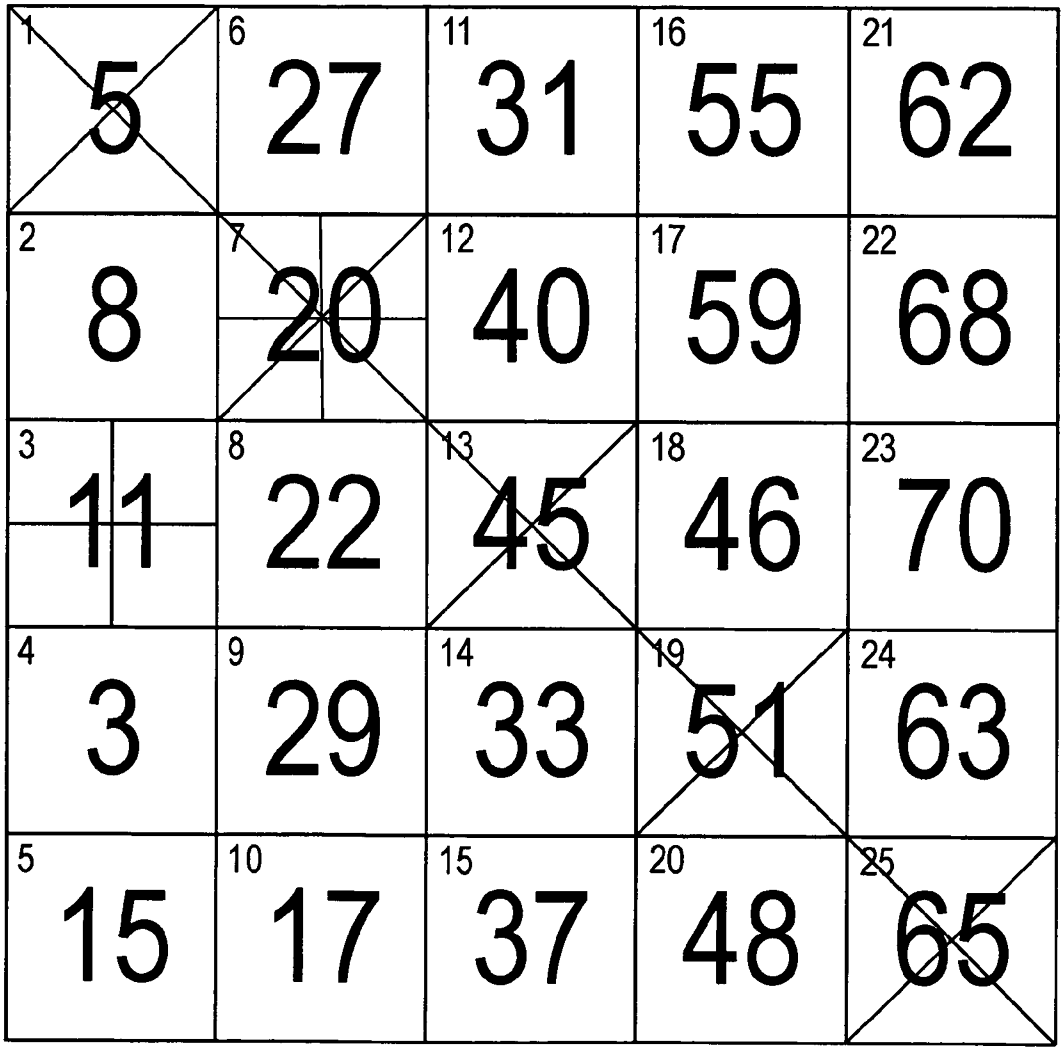
FIG. 8 is a representation of a bingo card showing a winning pattern with bonus designations applied according to the present invention.

Examples of the step shown at process blocks 704 and 705 in FIG. 7 may be described with reference to the example bingo card shown in FIG. 8 and the prize definition table shown in FIG. 9. FIG. 8 shows a representation of a bingo card having the 5×5 grid structure familiar to traditional bingo games. Each of the twenty-five locations in the bingo card is associated with a particular bingo designation selected from a pool of bingo designations. The card locations shown in FIG. 8 are labeled numerically with an identifying number appearing in the upper left-hand corner of each location. The card designation in each card location comprises the large numerical value in the center of the respective card location. For example, the bingo designation 5 resides at card location 1 and the bingo designation 8 resides at card location 2. It will be appreciated by those skilled in the field of bingo gaming systems that the game of bingo is not limited to any, particular type of bingo card and may be played with any number of different types of bingo cards including the 5×5 representations shown in FIG. 8. Alternatively to the 5×5 grid, bingo games may be played with 3×3 grids or even straight line arrays of bingo designations, or designations arranged in any other fashion provided that the arrangement facilitates the identification of different patterns. It will also be appreciated that regardless of the structure of the bingo cards, any bingo card may be defined as a data structure. For example, a data structure for defining the bingo card shown in FIG. 8 may comprise an array of 25 numbers with the first number in the sequence representing the first location in the bingo card, the second number in the sequence representing the designation at the second location, and so on.

Figure 9:
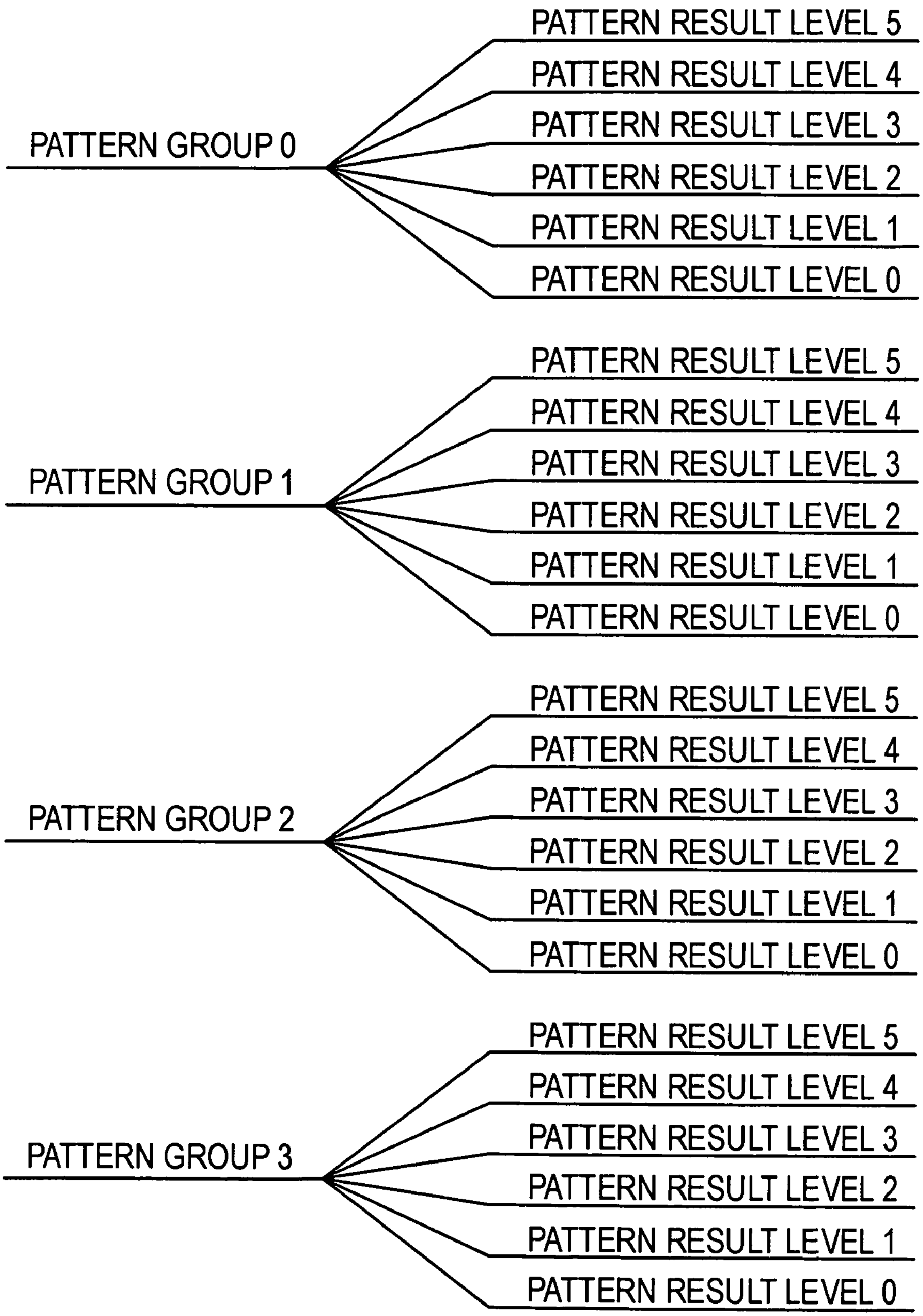
FIG. 9 is a diagram showing the relationship between patterns achieved in a bingo game and the various pattern result levels associated with each pattern group.

FIG. 9 shows an example of a generic result relationship table for a bingo game using bonus designations in accordance with the present invention. The table is generic in that it does not include any description of specific bingo patterns, but merely that there are four different pattern groups. Each of these pattern groups may include one or more patterns as described in U.S. Pat. No. 6,569,017 B2 and U.S. Patent Application Publication No. 2004/0048647 A1. Each pattern group shown in FIG. 9 is associated with six different pattern result levels. Each of these pattern result levels may comprise a respective prize level for the game or may be mapped together with other prize levels to a respective prize level for the game as will be discussed further below. It will be appreciated that the invention is by no means limited to this illustrated number of pattern groups or the illustrated number of pattern result levels associated with each pattern group. Furthermore, it will be appreciated that the different pattern groups may not all be associated with the same number of pattern result levels. For example, one pattern group may be associated with six pattern result levels while another pattern group may be associated with ten pattern result levels. It should be noted that the number of pattern result levels associated with a given pattern group may depend upon the manner in which the bonus designations are applied to identify the various pattern result levels. For example, if the bonus designations are applied only to the spots included in a given pattern to distinguish between different pattern result levels, the number of pattern result levels is limited by the number of card locations included in the given pattern. On the other hand, if the bonus designations are applied to any of the card locations included in a bingo card to distinguish between pattern result levels, then the number of pattern result levels associated with a given pattern is limited only by the number of bonus designations being considered as long as this number is less than or equal to the number of designations included in the bingo card.

Referring again to FIG. 8, the example bingo card is assumed to have been matched against a draw to produce a straight line diagonal bingo pattern including the designations 5, 20, 45, 51, and 65 as indicated by the X marked through the respective card locations. Assume for a first example that the set of bonus designations are applied against just the card locations included in a pattern to distinguish between different pattern result levels. Assume also that the set of bonus designations to be applied include the designations 11, 14, 20, 30, and 67. Matches between the card designations and this set of bonus designations are marked with a plus sign in FIG. 8. With this combination only a single one of the bonus designations, the designation 20, matches a designation included in the straight line pattern. Thus, under this bonus designation application rule, the pattern result level associated with this combination of winning pattern and bonus designation set could be defined as pattern result level 1. As another example for the same pattern shown in FIG. 8, assume the bonus designation set comprises the designations 11, 14, 20, 45, and 67. In this case, the bonus designation set includes two designations matching designations included in the bingo pattern, the designations 20 and 45. This would identify a different pattern result level for the combination, which may be defined as pattern result level 2 since two of the bonus designations match designations included in the bingo pattern. If none of the bonus designations matched designations in the bingo pattern under these bonus designation application rules, the pattern result level could be defined as pattern result level 0, while a match of three, four, and five bonus designations in the bingo pattern could be defined as pattern result levels 3, 4, and 5, respectively. It will be noted that this bonus designation application rule requires that the bingo pattern include at least five spots to produce all six possible pattern result levels, levels 0 through 5.

The bingo card and bingo pattern shown in FIG. 8, may also be used to describe an alternate preferred bonus designation application rule in which the bonus designations are applied against any of the card locations in the bingo card. For this alternative method of applying the bonus designations, assume again the straight line diagonal bingo pattern shown in FIG. 8 and the same bonus designation set made up of the designations 11, 14, 20, 30, and 67 as in the previous example. Applying this set of bonus designations against all of the designations included in the bingo card shown in FIG. 8, two of the bonus designations, 11 and 20, match designations in the bingo card. Thus, under this alternate bonus matching rule, the combination of the illustrated bingo pattern and the set of bonus designations 11, 14, 20, 30, and 67 may be defined as producing pattern result level 2. Assuming the second example of bonus designations described above, 11, 14, 20, 45, and 67, there would be three matches (designations 11, 20, and 45) and the result could be defined as pattern result level 3. These examples demonstrate the effect that the manner in which bonus designations are applied may have upon the pattern result level and results in the bingo game conducted according to the present invention. Also, it will be noted that this alternate rule for applying bonus designations is not limited by the number of card locations making up a bingo pattern.

There are numerous variations in the manner in which bonus designations may be applied according to the present invention, and the invention is by no means limited to the two alternatives described above. For example, the two alternatives described above may be combined to provide even additional pattern result levels. Also, multiple sets of bonus designations may be considered separately to further expand or distinguish between different pattern result levels. For example, a first set of bonus designations may include three designations and a second set of bonus designations may include an additional three designations. For a given bingo pattern, there would be a maximum of four intermediate pattern result levels considering the first set of bonus designations and each of those intermediate pattern result levels would be associated with an additional four final pattern result levels considering the second set of bonus designations. Thus, for each pattern group there would be a potential total of sixteen pattern result levels considering the two sets of three bonus designations each.

There are also numerous variations in which the present invention may be implemented to increase player interest and excitement. In one preferred implementation, the bonus designations are applied against any card locations on the bingo cards and are selected after the players are aware of their respective bingo cards but before the bingo game is conducted. Under this implementation, the players know the pattern result level for their result in the bingo game prior to knowing the pattern matched in the bingo game, but do not know to which pattern group the pattern result level will be applied. Considerable excitement may be generated at this point for players having high pattern result levels, considering that they may be eligible for a high prize depending upon the pattern their card achieves in the bingo game.

Referring to FIG. 9, it will be noted that a given pattern result level may be mapped to any prize level available in the game. An implementation of the invention may include a different prize level for each pattern result level. Alternate implementations may map multiple pattern result levels to various prize levels available in the game. The different pattern result levels may be grouped together to produce the desired overall odds of winning at a particular prize level in a game conducted according to the present invention. For example, two or more pattern result levels where each bonus designation is matched under the given bonus designation application rules may be mapped to a single prize level. Other pattern result levels for one of these patterns may be mapped to a different prize level. Thus, a single pattern achieved in the bingo game may produce different results depending upon the application of the set of bonus designations. For example, pattern result level 5 for pattern group 0 and pattern result level 5 for pattern group 1 may be mapped to the same prize level, while pattern result level 4 for pattern group 0 and pattern result level 4 for pattern group 1 may be mapped to different prize level. The pattern result levels may be mapped or grouped in any suitable fashion to achieve the desired prize structure and pay table for the bingo game.

The steps performed in the process shown in FIG. 7 are preferably performed by different processing components under the control of operational program code. The manual or player selection of bonus designations may be performed under the control of bonus designation selection program code executed at the respective EPS 103. Automatic bonus designation selection may be performed by suitable random designation generator program code executed at the EPS 103, LAS 102, or CGS 101. The bingo game itself is conducted under the control of bingo game program code executed at the CGS 101 in one preferred form of the invention or perhaps a LAS 102 under certain circumstances as described above and in U.S. Patent Application Publication No. 2004/0152499 A1. The step of applying bonus designations and identifying pattern result levels shown at block 704 in FIG. 7 is preferably performed by under the control of pattern result level or result identifying program code preferably executed by the same processing element executing the bingo game program code. The step of awarding prizes/results shown at 705 in FIG. 7 is preferably performed by result awarding program code also preferably executed by the same processing component executing the bingo game program code.

As used herein, whether in the above description or the following claims, the terms "comprising", "including", "carrying", "having", "containing", "involving", and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the present invention. For example, although a particular hardware arrangement is shown for purposes of describing the invention, it will be appreciated that numerous hardware arrangements are possible for implementing the present invention. Also, although the operational software-controlled process steps are described as occurring at certain processing elements in the system, the processing steps may be distributed in any suitable fashion over various data processing elements.

The invention claimed is:

1. A method including:

(a) providing at least one pattern group including at least one winning bingo pattern, each pattern group also mapped to two or more pattern result levels respectively mapped to two or more different prize levels, wherein the pattern groups, pattern result levels, and prize levels are stored in a data structure in computer memory so as to achieve a desired prize structure and a desired paytable for a bingo game;

(b) after completing, using at least one processor, at least one winning bingo pattern including a game ending pattern, but before selecting a prize result level for the winning bingo pattern, looking up in the data structure a corresponding pattern group that corresponds to the winning bingo pattern and selecting a set of one or more bonus designations;

(c) applying, using at least one processor, at least one of the winning bingo patterns in combination with the set of bonus designations to look up in the data structure a respective one of the pattern result levels mapped to the corresponding pattern group for a game play request in a bingo game, the respective one of the pattern result levels being identified from among two or more pattern result levels defined for a respective winning bingo pattern achieved for the game play request, the bonus designations being selected from a pool of designations employed to form the winning bingo patterns, the bonus designations each being a single bingo number for matching against a playing card representation, a match being a single bonus designation matching a single card designation in a single location in the playing card representation; and (d) causing, using at least one processor, a credit award corresponding to the identified pattern result level to be awarded to a player at an electronic player station, and causing a display device to display game presentation graphics associated with the credit award.

2. The method of claim 1 wherein the set of bonus designations is applied to identify the respective pattern result level for the game play request by matching the set of bonus designations only with a number of game designations included in the respective winning bingo pattern.

3. The method of claim 1 wherein the set of bonus designations is manually selected by a player selecting individual numbers which they desire to be bonus designations.

4. The method of claim 1 wherein the set of bonus designations is automatically selected under the control of a processing device.

5. The method of claim 1 further including identifying a prize for the game play request based on the respective pattern result level identified for the game play request.

6. The method of claim 1 further including: (a) selecting an additional set of one or more bonus designations; and (b) applying the additional set of bonus designations to identify an additional pattern result level for the game play request, the additional pattern result level being identified from among the two or more pattern result levels defined for the bingo pattern achieved for the game play request.

7. The method of claim 1 further including applying the set of bonus designations to identify a second pattern result level for a second game play request, the second pattern result level being identified from among two or more pattern result levels defined for a respective bingo pattern achieved for the second game play request.

8. The method of claim 7 wherein the game play request and the second game play request are associated with the same bingo game round.

9. The method of claim 7 further including identifying a prize for the second game play request based on the second pattern result level identified for the second game play request.

10. The method of claim 1, wherein the pattern result levels are provided in multiple groups of one or more pattern result levels.

11. The method of claim 10, wherein at least one of the groups has a different number of pattern result levels from another one of the groups.

12. An apparatus for determining prizes associated with winning bingo results, including:

(a) a processing device adapted for providing at least one pattern group including at least one winning bingo pattern, each pattern group also mapped to two or more pattern result levels mapped respectively to two or more different prize levels, wherein the pattern groups, pattern result levels, and prize levels are stored in a data structure in computer memory so as to achieve a desired prize structure and a desired paytable for a bingo game;

(b) a bonus designation selection device for selecting a set of one or more bonus designations and looking up in the data structure a corresponding pattern group that corresponds to the winning bingo pattern after completing at least one winning bingo pattern including a game ending pattern, but before selecting a prize result level for the winning bingo pattern;

(c) one or more processing devices for identifying at least one winning bingo pattern including a game ending bingo pattern achieved for a player in a bingo game, for applying at least one winning bingo pattern in combination with the set of bonus designations to look up in the data structure one of the respective pattern result levels mapped to the corresponding pattern group and for awarding a prize to the player based upon the respective one of the pattern result levels, the respective one of the pattern result levels being identified from two or more pattern result levels defined for a respective winning bingo pattern achieved for the player; and (d) wherein the bonus designations are selected from a pool of designations employed to form the winning bingo patterns, the bonus designations each being a single bingo number for matching against a playing card representation, a match being a single bonus designation matching a single card designation in a single location in the playing card representation.

13. The apparatus of claim 12 wherein the one or more processing devices apply the set of bonus designations to identify the respective pattern result level for the player by matching the set of bonus designations only with a number of game designations included in the respective winning pattern.

14. The apparatus of claim 12 wherein the one or more processing devices apply the set of bonus designations to identify the respective pattern result level for the player by matching the set of bonus designations with a set of card designations included on a bingo card for the player.

15. The apparatus of claim 12 wherein the bonus designation selection device includes a player interface device for enabling the player to manually select the set of bonus designations by selecting individual numbers which they desire to be bonus designations.

16. The apparatus of claim 15 wherein the bonus designation selection device comprises a processing device for selecting the set of bonus designations.

17. A program product stored on one or more machine readable storage devices and executable by a processing device, the program product for causing a processing device to determine prizes associated with winning bingo results, including:

(a) bingo game program code executable by the processing device for conducting a bingo game to complete at least one winning bingo pattern including a game ending pattern and for mapping two or more pattern result levels respectively to two or more different prize levels, so as to achieve a desired prize structure and paytable for a bingo game, wherein (i) the winning bingo pattern is stored in a respective pattern group, (ii) the pattern group is mapped to two or more pattern result levels, and (iii) the pattern groups, pattern result levels, and prize levels are stored in a data structure in computer memory;

(b) bonus designation selection program code executable by the processing device for selecting a set of one or more bonus designations and looking up in the data structure a corresponding pattern group that corresponds to the winning bingo pattern after the game ending pattern is completed, but before selecting a prize result level for the winning bingo pattern; and (c) pattern result level identifying program code executable by the processing device for applying at least one of the winning bingo patterns in combination with the set of bonus designations to look up in the data structure one of the pattern result levels mapped to the corresponding pattern group for a respective game play request, the respective one of the pattern result levels being identified from among two or more pattern result levels defined for a selected winning bingo pattern achieved for the respective game play request, wherein the bonus designations are selected from a pool of designations employed to form the winning bingo patterns, the bonus designations each being a single bingo number for matching against a playing card representation, a match being a single bonus designation matching a single card designation in a single location in the playing card representation.

18. The program product of claim 17 wherein the pattern result level identifying program code is executable for applying the set of bonus designations to identify a respective pattern result level for the game play request by matching the set of bonus designations only with a number of game designations included in the selected winning bingo pattern.

19. The program product of claim 17 wherein the pattern result level identifying program code is executable for applying the set of bonus designations to identify the respective pattern result level for the game play request by matching the set of bonus designations with a set of card designations included in a bingo card associated with the respective game play request.

20. The program product of claim 17 wherein the bonus designation selection program code is executable for randomly selecting the set of bonus designations from a pool of available bonus designations.

21. The program product of claim 17 wherein the pattern result level identifying program code is executable for applying the set of bonus designations to identify a second pattern result level for a second game play request, the second pattern result level being identified from among two or more pattern result levels defined for the bingo pattern achieved for the second game play request.

22. The program product of claim 21 wherein the game play request and the second game play request are associated with the same bingo game round.

23. The program product of claim 21 further including a result awarding program code executable for identifying a prize for the game play request based on the pattern result level identified for the game play request and for identifying a prize for the second game play request based upon the pattern result level identified for the second game play request.

24. The program product of claim 17 further including a result awarding program code executable for identifying a prize for the game play request based on the respective pattern result level for the game play request.

25. A method including:

(a) providing at least one pattern group including at least one winning bingo pattern, each pattern group also mapped to two or more pattern result levels mapped respectively to two or more different prize levels, wherein the pattern groups, pattern result levels, and prize levels are stored in a data structure in computer memory so as to achieve a desired prize structure and paytable for a bingo game;

(b) selecting, using at least one processor, a set of game designations from a pool of designations;

(c) applying, using at least one processor, the set of game designations to a playing card representation, which includes a set of card designations each occupying a single location in the playing card representation, said application performed by matching the set of game designations to the set of card designations to form at least one winning bingo pattern, including a game ending pattern;

(d) after completing the game ending pattern, but before selecting a prize result level for the winning bingo pattern, (i) looking up in the data structure, using at least one processor, a corresponding pattern group that corresponds to the winning bingo pattern, and (ii) selecting, using at least one processor, a set of one or more bonus designations, the bonus designations being selected from the same pool of designations from which the game designations were selected, the bonus designations each being a single bingo number for matching against the playing card representation after completing at least one winning bingo pattern including a game ending pattern;

(e) applying, using at least one processor, the set of bonus designations to a subset of the set of card designations, or all of the set of card designations, to which the set of game designations are applied, to determine a count for the number of matches, a match being a single bonus designation matching a single card designation in a single location in the playing card representation, which may be zero or more matches;

(f) after determining a count, using at least one processor, looking up in the data structure a respective one of the pattern result levels mapped to the corresponding pattern group for a game play request in a bingo game based on the count, the respective one of the pattern result levels being identified from among two or more pattern result levels defined for the at least one winning bingo pattern; and (g) causing, using at least one processor, a credit award corresponding to the identified pattern result level to be awarded to a player at an electronic player station, and causing a display device to display game presentation graphics associated with the credit award.

26. The method of claim 25 wherein the set of bonus designations is applied to a subset of the card designations, the subset being those card designations included in a selected winning pattern for the playing card representation.

27. The method of claim 25 wherein the set of bonus designations is manually selected by a player selecting individual numbers which they desire to be bonus designations either before the game is started or after the bingo game has been played.

28. The method of claim 27 wherein the player is allowed to select the bonus applications after viewing the playing card representation either before the game is started or after the bingo game has been played.

* * * * *